United States Patent
Kottomtharayil et al.

(10) Patent No.: US 9,201,917 B2
(45) Date of Patent: *Dec. 1, 2015

(54) SYSTEMS AND METHODS FOR PERFORMING STORAGE OPERATIONS IN A COMPUTER NETWORK

(71) Applicant: CommVault Systems, Inc., Oceanport, NJ (US)

(72) Inventors: Rajiv Kottomtharayil, Marlboro, NJ (US); Parag Gokhale, Marlboro, NJ (US); Anand Prahlad, Bangalore (IN); Manoj Kumar Vijayan, Marlboro, NJ (US); David Ngo, Shrewsbury, NJ (US); Varghese Devassy, Ottawa (CA)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,721

(22) Filed: Sep. 19, 2014

(65) Prior Publication Data

US 2015/0095571 A1    Apr. 2, 2015

Related U.S. Application Data

(63) Continuation of application No. 14/183,777, filed on Feb. 19, 2014, now Pat. No. 8,892,826, which is a continuation of application No. 13/750,719, filed on Jan. 25, 2013, now Pat. No. 8,688,931, which is a (Continued)

(51) Int. Cl.
*G06F 12/02* (2006.01)
*G06F 17/30* (2006.01)
(Continued)

(52) U.S. Cl.
CPC .......... *G06F 17/30321* (2013.01); *G06F 3/067* (2013.01); *G06F 3/0617* (2013.01);
(Continued)

(58) Field of Classification Search
CPC ..... G06F 11/1448; G06F 12/02; G06F 11/14; G06F 17/30321; G06F 3/0617; G06F 3/0619; G06F 3/0635; G06F 3/0655; G06F 3/067; G06F 3/0689; G06F 11/1469; G06F 17/30864; G06F 67/1097
USPC .................. 711/154, 156, 162; 714/6.3, 6.32; 707/639, 649
See application file for complete search history.

(56) References Cited

U.S. PATENT DOCUMENTS

| 4,686,620 | A | 8/1987 | Ng |
| 4,995,035 | A | 2/1991 | Cole et al. |

(Continued)

FOREIGN PATENT DOCUMENTS

| EP | 0259912 | 3/1988 |
| EP | 0405926 | 1/1991 |

(Continued)

OTHER PUBLICATIONS

U.S. Appl. No. 13/963,693, filed Aug. 9, 2013, Kottomtharayil et al.

(Continued)

*Primary Examiner* — Stephen Elmore
(74) *Attorney, Agent, or Firm* — Knobbe, Martens, Olson & Bear, LLP

(57) ABSTRACT

Methods and systems are described for performing storage operations on electronic data in a network. In response to the initiation of a storage operation and according to a first set of selection logic, a media management component is selected to manage the storage operation. In response to the initiation of a storage operation and according to a second set of selection logic, a network storage device to associate with the storage operation. The selected media management component and the selected network storage device perform the storage operation on the electronic data.

20 Claims, 8 Drawing Sheets

Related U.S. Application Data continuation of application No. 13/465,890, filed on May 7, 2012, now Pat. No. 8,364,914, which is a continuation of application No. 12/813,398, filed on Jun. 10, 2010, now Pat. No. 8,176,268, which is a continuation of application No. 12/353,510, filed on Jan. 14, 2009, now Pat. No. 7,739,459, which is a continuation of application No. 11/778,445, filed on Jul. 16, 2007, now Pat. No. 7,484,054, which is a continuation of application No. 10/818,749, filed on Apr. 5, 2004, now Pat. No. 7,246,207.

(60) Provisional application No. 60/460,234, filed on Apr. 3, 2003.

(51) Int. Cl.
*G06F 3/06* (2006.01)
*H04L 29/08* (2006.01)
*G06F 11/14* (2006.01)

(52) U.S. Cl.
CPC ............ *G06F3/0619* (2013.01); *G06F 3/0635* (2013.01); *G06F 3/0655* (2013.01); *G06F 3/0689* (2013.01); *G06F 11/1448* (2013.01); *G06F 11/1469* (2013.01); *G06F 17/30864* (2013.01); *H04L 67/1097* (2013.01); *G06F 11/1464* (2013.01); *Y10S 707/99953* (2013.01); *Y10S 707/99955* (2013.01)

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,310 A | 4/1994 | Isman et al. |
| 5,321,816 A | 6/1994 | Rogan et al. |
| 5,333,315 A | 7/1994 | Saether et al. |
| 5,347,653 A | 9/1994 | Flynn et al. |
| 5,388,243 A | 2/1995 | Glider et al. |
| 5,410,700 A | 4/1995 | Fecteau et al. |
| 5,412,668 A | 5/1995 | Dewey |
| 5,448,724 A | 9/1995 | Hayashi et al. |
| 5,455,926 A | 10/1995 | Keele et al. |
| 5,465,359 A | 11/1995 | Allen et al. |
| 5,491,810 A | 2/1996 | Allen |
| 5,495,457 A | 2/1996 | Takagi et al. |
| 5,495,607 A | 2/1996 | Pisello et al. |
| 5,499,364 A | 3/1996 | Klein et al. |
| 5,504,873 A | 4/1996 | Martin et al. |
| 5,506,986 A | 4/1996 | Healy |
| 5,544,345 A | 8/1996 | Carpenter et al. |
| 5,544,347 A | 8/1996 | Yanai et al. |
| 5,548,521 A | 8/1996 | Krayer et al. |
| 5,559,957 A | 9/1996 | Balk |
| 5,608,865 A | 3/1997 | Midgely et al. |
| 5,619,644 A | 4/1997 | Crockett et al. |
| 5,633,999 A | 5/1997 | Clowes et al. |
| 5,638,509 A | 6/1997 | Dunphy et al. |
| 5,659,743 A | 8/1997 | Adams et al. |
| 5,673,381 A | 9/1997 | Huai et al. |
| 5,677,900 A | 10/1997 | Nishida et al. |
| 5,699,361 A | 12/1997 | Ding et al. |
| 5,729,743 A | 3/1998 | Squibb |
| 5,737,747 A | 4/1998 | Vishlitsky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,790,775 A | 8/1998 | Marks et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,815,662 A | 9/1998 | Ong |
| 5,829,023 A | 10/1998 | Bishop |
| 5,829,046 A | 10/1998 | Tzelnic et al. |
| 5,832,522 A | 11/1998 | Blickenstaff et al. |
| 5,860,068 A | 1/1999 | Cook |
| 5,875,478 A | 2/1999 | Blumenau |
| 5,875,481 A | 2/1999 | Ashton et al. |
| 5,887,134 A | 3/1999 | Ebrahim |
| 5,890,159 A | 3/1999 | Sealby et al. |
| 5,893,139 A | 4/1999 | Kamiyama et al. |
| 5,898,593 A | 4/1999 | Baca et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 5,978,577 A | 11/1999 | Rierden et al. |
| 6,021,415 A | 2/2000 | Cannon et al. |
| 6,023,705 A | 2/2000 | Bellinger et al. |
| 6,026,398 A | 2/2000 | Brown et al. |
| 6,026,414 A | 2/2000 | Anglin |
| 6,035,306 A | 3/2000 | Lowenthal et al. |
| 6,052,735 A | 4/2000 | Ulrich et al. |
| 6,076,148 A | 6/2000 | Kedem et al. |
| 6,078,990 A | 6/2000 | Frazier |
| 6,081,812 A | 6/2000 | Boggs et al. |
| 6,088,694 A | 7/2000 | Burns et al. |
| 6,094,416 A | 7/2000 | Ying |
| 6,105,122 A | 8/2000 | Muller et al. |
| 6,105,136 A | 8/2000 | Cromer et al. |
| 6,128,750 A | 10/2000 | Espy |
| 6,131,095 A | 10/2000 | Low et al. |
| 6,131,099 A | 10/2000 | Johnson et al. |
| 6,131,147 A | 10/2000 | Takagi |
| 6,131,190 A | 10/2000 | Sidwell |
| 6,137,864 A | 10/2000 | Yaker |
| 6,148,349 A | 11/2000 | Chow et al. |
| 6,148,412 A | 11/2000 | Cannon et al. |
| 6,149,316 A | 11/2000 | Harari et al. |
| 6,154,738 A | 11/2000 | Call |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,195,794 B1 | 2/2001 | Buxton |
| 6,212,512 B1 | 4/2001 | Barney et al. |
| 6,223,205 B1 | 4/2001 | Harchol-Balter et al. |
| 6,246,882 B1 | 6/2001 | Lachance |
| 6,247,077 B1 | 6/2001 | Muller et al. |
| 6,256,740 B1 | 7/2001 | Muller et al. |
| 6,260,069 B1 | 7/2001 | Anglin |
| 6,266,678 B1 | 7/2001 | McDevitt et al. |
| 6,266,784 B1 | 7/2001 | Hsiao et al. |
| 6,269,382 B1 | 7/2001 | Cabrera et al. |
| 6,269,431 B1 | 7/2001 | Dunham |
| 6,275,953 B1 | 8/2001 | Vahalia et al. |
| 6,295,541 B1 | 9/2001 | Bodnar |
| 6,301,592 B1 | 10/2001 | Aoyama et al. |
| 6,304,880 B1 | 10/2001 | Kishi |
| 6,308,245 B1 | 10/2001 | Johnson et al. |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,338,006 B1 | 1/2002 | Jesionowski et al. |

(56) References Cited

U.S. PATENT DOCUMENTS

| | | |
|---|---|---|
| 6,343,324 B1 | 1/2002 | Hubis et al. |
| 6,343,342 B1 | 1/2002 | Carlson |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,901 B1 | 3/2002 | MacLeod et al. |
| 6,366,900 B1 | 4/2002 | Hu |
| 6,374,266 B1 | 4/2002 | Shnelvar |
| 6,374,336 B1 | 4/2002 | Peters et al. |
| 6,385,673 B1 | 5/2002 | DeMoney |
| 6,389,432 B1 | 5/2002 | Pothapragada et al. |
| 6,411,571 B1 | 6/2002 | Mitsunari et al. |
| 6,418,441 B1 | 7/2002 | Call |
| 6,418,478 B1 | 7/2002 | Ignatius et al. |
| 6,421,711 B1 | 7/2002 | Blumenau et al. |
| 6,434,682 B1 | 8/2002 | Ashton et al. |
| 6,438,586 B1 | 8/2002 | Hass et al. |
| 6,457,017 B2 | 9/2002 | Watkins et al. |
| 6,484,166 B1 | 11/2002 | Maynard |
| 6,487,561 B1 | 11/2002 | Ofek et al. |
| 6,487,644 B1 | 11/2002 | Huebsch et al. |
| 6,490,666 B1 | 12/2002 | Cabrera et al. |
| 6,496,744 B1 | 12/2002 | Cook |
| 6,505,307 B1 | 1/2003 | Stell et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,571,310 B1 | 5/2003 | Ottesen |
| 6,581,143 B2 | 6/2003 | Gagne et al. |
| 6,594,698 B1 | 7/2003 | Chow et al. |
| 6,615,349 B1 | 9/2003 | Hair |
| 6,631,442 B1 | 10/2003 | Blumenau |
| 6,631,493 B2 | 10/2003 | Ottesen et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,662,281 B2 | 12/2003 | Ballard et al. |
| 6,665,740 B1 | 12/2003 | Mason et al. |
| 6,669,832 B1 | 12/2003 | Saito et al. |
| 6,674,924 B2 | 1/2004 | Wright et al. |
| 6,704,839 B2 | 3/2004 | Butterworth et al. |
| 6,711,632 B1 | 3/2004 | Chow et al. |
| 6,721,334 B1 | 4/2004 | Ketcham |
| 6,732,124 B1 | 5/2004 | Koseki et al. |
| 6,732,293 B1 | 5/2004 | Schneider |
| 6,757,794 B2 | 6/2004 | Cabrera et al. |
| 6,763,351 B1 | 7/2004 | Subramaniam et al. |
| 6,763,438 B2 | 7/2004 | Ogawa et al. |
| 6,771,595 B1 | 8/2004 | Gilbert et al. |
| 6,785,078 B2 | 8/2004 | Basham et al. |
| 6,789,161 B1 | 9/2004 | Blendermann et al. |
| 6,791,910 B1 | 9/2004 | James et al. |
| 6,799,255 B1 | 9/2004 | Blumenau et al. |
| 6,802,025 B1 | 10/2004 | Thomas et al. |
| 6,820,035 B1 | 11/2004 | Zahavi |
| 6,832,186 B1 | 12/2004 | Margulieux |
| 6,851,031 B2 | 2/2005 | Trimmer et al. |
| 6,859,758 B1 | 2/2005 | Prabhakaran et al. |
| 6,862,622 B2 | 3/2005 | Jorgensen |
| 6,871,163 B2 | 3/2005 | Hiller et al. |
| 6,880,052 B2 | 4/2005 | Lubbers et al. |
| 6,886,020 B1 | 4/2005 | Zahavi et al. |
| 6,909,356 B2 | 6/2005 | Brown et al. |
| 6,912,627 B2 | 6/2005 | Matsunami et al. |
| 6,922,687 B2 | 7/2005 | Vernon |
| 6,934,879 B2 | 8/2005 | Misra et al. |
| 6,941,370 B2 | 9/2005 | Boies et al. |
| 6,941,396 B1 | 9/2005 | Thorpe et al. |
| 6,950,723 B2 | 9/2005 | Gallo et al. |
| 6,952,758 B2 | 10/2005 | Chron et al. |
| 6,965,968 B1 | 11/2005 | Touboul et al. |
| 6,968,351 B2 | 11/2005 | Butterworth |
| 6,968,479 B2 | 11/2005 | Wyatt et al. |
| 6,972,918 B2 | 12/2005 | Kokami et al. |
| 6,973,369 B2 | 12/2005 | Trimmer et al. |
| 6,973,553 B1 | 12/2005 | Archibald, Jr. et al. |
| 6,983,277 B2 | 1/2006 | Yamaguchi et al. |
| 6,983,322 B1 | 1/2006 | Tripp et al. |
| 6,983,351 B2 | 1/2006 | Gibble et al. |
| 6,993,625 B2 | 1/2006 | Ogawa et al. |
| 7,003,519 B1 | 2/2006 | Biettron et al. |
| 7,003,641 B2 | 2/2006 | Prahlad et al. |
| 7,006,435 B1 | 2/2006 | Davies et al. |
| 7,010,387 B2 | 3/2006 | Lantry et al. |
| 7,012,529 B2 | 3/2006 | Sajkowsky |
| 7,013,372 B2 | 3/2006 | Achiwa et al. |
| 7,034,683 B2 | 4/2006 | Ghazarian |
| 7,035,880 B1 | 4/2006 | Crescenti et al. |
| 7,039,827 B2 | 5/2006 | Meyer et al. |
| 7,058,649 B2 | 6/2006 | Ough et al. |
| 7,062,761 B2 | 6/2006 | Slavin et al. |
| 7,069,380 B2 | 6/2006 | Ogawa et al. |
| 7,069,466 B2 | 6/2006 | Trimmer et al. |
| 7,082,441 B1 | 7/2006 | Zahavi et al. |
| 7,085,786 B2 | 8/2006 | Carlson et al. |
| 7,085,904 B2 | 8/2006 | Mizuno et al. |
| 7,093,089 B2 | 8/2006 | De Brebisson |
| 7,096,269 B2 | 8/2006 | Yamagami |
| 7,096,315 B2 | 8/2006 | Takeda et al. |
| 7,103,619 B1 | 9/2006 | Rajpurkar et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,117,246 B2 | 10/2006 | Christenson et al. |
| 7,118,034 B2 | 10/2006 | Baldassari et al. |
| 7,120,757 B2 | 10/2006 | Tsuge |
| 7,120,823 B2 | 10/2006 | Foster et al. |
| 7,130,970 B2 | 10/2006 | Devassy et al. |
| 7,136,720 B2 | 11/2006 | Deckers |
| 7,146,377 B2 | 12/2006 | Nowicki et al. |
| 7,155,465 B2 | 12/2006 | Lee et al. |
| 7,155,486 B2 | 12/2006 | Aoshima et al. |
| 7,155,633 B2 | 12/2006 | Tuma et al. |
| 7,159,110 B2 | 1/2007 | Douceur et al. |
| 7,162,496 B2 | 1/2007 | Amarendran et al. |
| 7,162,604 B1 | 1/2007 | Nourmohamadian et al. |
| 7,162,693 B2 | 1/2007 | Yamanaka et al. |
| 7,173,929 B1 | 2/2007 | Testardi |
| 7,174,433 B2 | 2/2007 | Kottomtharayil et al. |
| 7,181,578 B1 | 2/2007 | Guha et al. |
| 7,191,283 B2 | 3/2007 | Amemiya et al. |
| 7,197,490 B1 | 3/2007 | English |
| 7,200,621 B2 | 4/2007 | Beck et al. |
| 7,203,944 B1 | 4/2007 | Van Rietschote et al. |
| 7,209,949 B2 | 4/2007 | Mousseau et al. |
| 7,213,118 B2 | 5/2007 | Goodman et al. |
| 7,216,244 B2 | 5/2007 | Amano |
| 7,222,172 B2 | 5/2007 | Arakawa et al. |
| 7,246,140 B2 | 7/2007 | Therrien et al. |
| 7,246,207 B2 | 7/2007 | Kottomtharayil et al. |
| 7,246,258 B2 | 7/2007 | Chen et al. |
| 7,246,272 B2 | 7/2007 | Cabezas et al. |
| 7,249,347 B2 | 7/2007 | Chang et al. |
| 7,249,357 B2 | 7/2007 | Landman et al. |
| 7,251,218 B2 | 7/2007 | Jorgensen |
| 7,251,708 B1 | 7/2007 | Justiss et al. |
| 7,257,257 B2 | 8/2007 | Anderson et al. |
| 7,269,612 B2 | 9/2007 | Devarakonda et al. |
| 7,272,606 B2 | 9/2007 | Borthakur et al. |
| 7,275,063 B2 | 9/2007 | Horn |
| 7,277,246 B2 | 10/2007 | Barbian et al. |
| 7,277,953 B2 | 10/2007 | Wils et al. |
| 7,278,142 B2 | 10/2007 | Bandhole et al. |
| 7,281,032 B2 | 10/2007 | Kodama |
| 7,287,047 B2 | 10/2007 | Kavuri |
| 7,287,252 B2 | 10/2007 | Bussiere et al. |
| 7,293,133 B1 | 11/2007 | Colgrove et al. |
| 7,302,540 B1 | 11/2007 | Holdman et al. |
| 7,315,807 B1 | 1/2008 | Lavallee et al. |
| 7,330,997 B1 | 2/2008 | Odom |

(56) References Cited

U.S. PATENT DOCUMENTS

| | | |
|---|---|---|
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,359,917 B2 | 4/2008 | Winter et al. |
| 7,379,850 B2 | 5/2008 | Sprogis et al. |
| 7,380,014 B2 | 5/2008 | LeCroy et al. |
| 7,380,019 B2 | 5/2008 | Shiga et al. |
| 7,380,072 B2 | 5/2008 | Kottomtharayil et al. |
| 7,383,462 B2 | 6/2008 | Osaki et al. |
| 7,395,282 B1 * | 7/2008 | Crescenti et al. .................. 1/1 |
| 7,395,387 B2 | 7/2008 | Berkowitz et al. |
| 7,401,728 B2 | 7/2008 | Markham et al. |
| 7,409,509 B2 | 8/2008 | Devassy et al. |
| 7,421,312 B2 | 9/2008 | Trossell |
| 7,421,511 B2 | 9/2008 | Shiga et al. |
| 7,426,537 B2 | 9/2008 | Lee et al. |
| 7,434,090 B2 | 10/2008 | Hartung et al. |
| 7,447,149 B1 | 11/2008 | Beesley et al. |
| 7,447,907 B2 | 11/2008 | Hart, III et al. |
| 7,448,079 B2 | 11/2008 | Tremain |
| 7,451,283 B2 | 11/2008 | Chen et al. |
| 7,454,569 B2 | 11/2008 | Kavuri et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,492 B2 | 2/2009 | Dai |
| 7,500,053 B1 | 3/2009 | Kavuri et al. |
| 7,500,150 B2 | 3/2009 | Sharma et al. |
| 7,509,443 B2 | 3/2009 | Matsuo et al. |
| 7,519,726 B2 | 4/2009 | Palliyil et al. |
| 7,523,483 B2 | 4/2009 | Dogan |
| 7,529,748 B2 | 5/2009 | Wen et al. |
| 7,529,782 B2 | 5/2009 | Prahlad et al. |
| 7,536,291 B1 | 5/2009 | Retnamma et al. |
| 7,539,702 B2 | 5/2009 | Deshmukh et al. |
| 7,539,783 B2 | 5/2009 | Kochunni et al. |
| 7,552,294 B1 | 6/2009 | Justiss |
| 7,565,340 B2 | 7/2009 | Herlocker et al. |
| 7,581,011 B2 | 8/2009 | Teng |
| 7,584,227 B2 | 9/2009 | Gokhale et al. |
| 7,584,298 B2 | 9/2009 | Klinker et al. |
| 7,587,749 B2 | 9/2009 | Leser et al. |
| 7,596,586 B2 | 9/2009 | Gokhale et al. |
| 7,603,518 B2 | 10/2009 | Kottomtharayil |
| 7,613,748 B2 | 11/2009 | Brockway et al. |
| 7,617,392 B2 | 11/2009 | Hair |
| 7,627,598 B1 | 12/2009 | Burke |
| 7,627,617 B2 | 12/2009 | Kavuri et al. |
| 7,631,194 B2 | 12/2009 | Wahlert et al. |
| 7,644,245 B2 | 1/2010 | Prahlad et al. |
| 7,657,666 B2 | 2/2010 | Kottomtharayil et al. |
| 7,659,820 B2 | 2/2010 | Schnee et al. |
| 7,660,812 B2 | 2/2010 | Findlay et al. |
| 7,680,843 B1 | 3/2010 | Panchbudhe et al. |
| 7,685,126 B2 | 3/2010 | Patel |
| 7,689,510 B2 | 3/2010 | Lamkin et al. |
| 7,702,659 B2 | 4/2010 | Ban et al. |
| 7,702,831 B2 | 4/2010 | Ma et al. |
| 7,707,060 B2 | 4/2010 | Chainer et al. |
| 7,712,094 B2 | 5/2010 | Shapiro |
| 7,720,817 B2 | 5/2010 | Stager et al. |
| 7,739,450 B2 | 6/2010 | Kottomtharayil |
| 7,739,459 B2 | 6/2010 | Kottomtharayil et al. |
| 7,748,610 B2 | 7/2010 | Bell et al. |
| 7,751,628 B1 | 7/2010 | Reisman |
| 7,765,167 B2 | 7/2010 | Prahlad et al. |
| 7,765,369 B1 | 7/2010 | Prahlad et al. |
| 7,769,961 B2 | 8/2010 | Kottomtharayil et al. |
| 7,805,416 B1 | 9/2010 | Compton et al. |
| 7,809,699 B2 | 10/2010 | Passmore et al. |
| 7,809,914 B2 | 10/2010 | Kottomtharayil et al. |
| 7,818,417 B2 | 10/2010 | Ginis et al. |
| 7,822,715 B2 | 10/2010 | Petruzzo |
| 7,827,363 B2 | 11/2010 | Devassy et al. |
| 7,831,553 B2 | 11/2010 | Prahlad et al. |
| 7,831,566 B2 | 11/2010 | Kavuri et al. |
| 7,840,537 B2 | 11/2010 | Gokhale et al. |
| 7,849,266 B2 | 12/2010 | Kavuri et al. |
| 7,861,011 B2 | 12/2010 | Kottomtharayil et al. |
| 7,873,802 B2 | 1/2011 | Gokhale et al. |
| 7,877,351 B2 | 1/2011 | Crescenti et al. |
| 7,877,362 B2 | 1/2011 | Gokhale et al. |
| 7,889,847 B2 | 2/2011 | Gainsboro |
| 7,890,796 B2 | 2/2011 | Pawar et al. |
| 7,904,350 B2 | 3/2011 | Ayala et al. |
| 7,917,473 B2 | 3/2011 | Kavuri et al. |
| 7,917,695 B2 | 3/2011 | Ulrich et al. |
| 7,934,071 B2 | 4/2011 | Abe et al. |
| 7,937,365 B2 | 5/2011 | Prahlad et al. |
| 7,937,393 B2 | 5/2011 | Prahlad et al. |
| 7,945,810 B2 | 5/2011 | Soran et al. |
| 7,949,512 B2 | 5/2011 | Retnamma et al. |
| 7,953,802 B2 | 5/2011 | Mousseau et al. |
| 7,958,307 B2 | 6/2011 | Kavuri et al. |
| 7,962,714 B2 | 6/2011 | Amarendran et al. |
| 7,969,306 B2 | 6/2011 | Ebert et al. |
| 7,975,061 B1 | 7/2011 | Gokhale et al. |
| 7,987,319 B2 | 7/2011 | Kottomtharayil |
| 8,032,718 B2 | 10/2011 | Kottomtharayil et al. |
| 8,040,727 B1 | 10/2011 | Harari |
| 8,041,905 B2 | 10/2011 | Devassy et al. |
| 8,051,043 B2 | 11/2011 | Young |
| 8,074,042 B2 | 12/2011 | Kottomtharayil et al. |
| 8,140,786 B2 | 3/2012 | Bunte et al. |
| 8,161,318 B2 | 4/2012 | D'Souza et al. |
| 8,166,263 B2 | 4/2012 | Prahlad |
| 8,176,268 B2 | 5/2012 | Kottomtharayil et al. |
| 8,219,524 B2 | 7/2012 | Gokhale |
| 8,230,195 B2 | 7/2012 | Amarendran et al. |
| 8,291,177 B2 | 10/2012 | Devassy et al. |
| 8,341,359 B2 | 12/2012 | Kottomtharayil et al. |
| 8,364,914 B2 | 1/2013 | Kottomtharayil et al. |
| 8,402,244 B2 | 3/2013 | Kottomtharayil et al. |
| 8,443,142 B2 | 5/2013 | Kavuri et al. |
| 8,510,516 B2 | 8/2013 | Kottomtharayil et al. |
| 8,661,216 B2 | 2/2014 | Kavuri et al. |
| 8,688,931 B2 | 4/2014 | Kottomtharayil et al. |
| 8,799,613 B2 | 8/2014 | Kottomtharayil et al. |
| 8,892,826 B2 | 11/2014 | Kottomtharayil et al. |
| 9,021,213 B2 | 4/2015 | Kottomtharayil et al. |
| 2002/0010661 A1 | 1/2002 | Waddington et al. |
| 2002/0029281 A1 | 3/2002 | Zeidner et al. |
| 2002/0032613 A1 | 3/2002 | Buettgenbach et al. |
| 2002/0040405 A1 | 4/2002 | Gold |
| 2002/0049778 A1 | 4/2002 | Bell et al. |
| 2002/0069324 A1 | 6/2002 | Gerasimov et al. |
| 2002/0107877 A1 | 8/2002 | Whiting et al. |
| 2002/0122543 A1 | 9/2002 | Rowen |
| 2002/0157113 A1 | 10/2002 | Allegrezza |
| 2002/0188592 A1 | 12/2002 | Leonhardt et al. |
| 2002/0194340 A1 | 12/2002 | Ebstyne et al. |
| 2003/0014433 A1 | 1/2003 | Teloh et al. |
| 2003/0016609 A1 | 1/2003 | Rushton et al. |
| 2003/0055671 A1 | 3/2003 | Nassar |
| 2003/0061491 A1 | 3/2003 | Jaskiewicz et al. |
| 2003/0065759 A1 | 4/2003 | Britt et al. |
| 2003/0099237 A1 | 5/2003 | Mitra et al. |
| 2003/0101155 A1 | 5/2003 | Gokhale et al. |
| 2003/0126361 A1 | 7/2003 | Slater et al. |
| 2003/0134619 A1 | 7/2003 | Phillips et al. |
| 2003/0169733 A1 | 9/2003 | Gurkowski et al. |
| 2003/0204700 A1 | 10/2003 | Biessener et al. |
| 2003/0220901 A1 | 11/2003 | Carr et al. |
| 2004/0010523 A1 | 1/2004 | Wu et al. |
| 2004/0044855 A1 | 3/2004 | Carlson et al. |
| 2004/0054607 A1 | 3/2004 | Waddington et al. |
| 2004/0073677 A1 | 4/2004 | Honma et al. |
| 2004/0073716 A1 | 4/2004 | Boom et al. |
| 2004/0083202 A1 | 4/2004 | Mu et al. |
| 2004/0088432 A1 | 5/2004 | Hubbard et al. |
| 2004/0098363 A1 | 5/2004 | Anglin et al. |

(56) References Cited

U.S. PATENT DOCUMENTS

| | | |
|---|---|---|
| 2004/0098547 A1 | 5/2004 | Ofek et al. |
| 2004/0107199 A1 | 6/2004 | Dairymple et al. |
| 2004/0122832 A1 | 6/2004 | Heil |
| 2004/0153719 A1 | 8/2004 | Achiwa et al. |
| 2004/0186847 A1 | 9/2004 | Rappaport et al. |
| 2004/0193397 A1 | 9/2004 | Lumb et al. |
| 2004/0193953 A1 | 9/2004 | Callahan et al. |
| 2004/0204949 A1 | 10/2004 | Shaji et al. |
| 2005/0008163 A1 | 1/2005 | Leser et al. |
| 2005/0021524 A1 | 1/2005 | Oliver |
| 2005/0033756 A1 | 2/2005 | Kottomtharayil et al. |
| 2005/0033913 A1 | 2/2005 | Kottomtharayil et al. |
| 2005/0039069 A1 | 2/2005 | Prahlad et al. |
| 2005/0044114 A1 | 2/2005 | Kottomtharayil et al. |
| 2005/0076264 A1 | 4/2005 | Rowan et al. |
| 2005/0080992 A1 | 4/2005 | Massey et al. |
| 2005/0102203 A1 | 5/2005 | Keong |
| 2005/0114477 A1 | 5/2005 | Willging et al. |
| 2005/0125807 A1 | 6/2005 | Brady et al. |
| 2005/0166011 A1 | 7/2005 | Burnett et al. |
| 2005/0172093 A1 | 8/2005 | Jain |
| 2005/0174869 A1 | 8/2005 | Kottomtharayil et al. |
| 2005/0177828 A1 | 8/2005 | Graham et al. |
| 2005/0210304 A1 | 9/2005 | Hartung et al. |
| 2005/0216534 A1 | 9/2005 | Ikezawa et al. |
| 2005/0246342 A1 | 11/2005 | Vernon |
| 2005/0246398 A1 | 11/2005 | Barzilai et al. |
| 2005/0246568 A1 | 11/2005 | Davies |
| 2005/0256972 A1 | 11/2005 | Cochran et al. |
| 2005/0262296 A1 | 11/2005 | Peake |
| 2005/0278299 A1 | 12/2005 | Yamada et al. |
| 2006/0004639 A1 | 1/2006 | O'Keefe |
| 2006/0004675 A1 | 1/2006 | Bennett et al. |
| 2006/0005048 A1 | 1/2006 | Osaki et al. |
| 2006/0010227 A1 | 1/2006 | Atluri |
| 2006/0011720 A1 | 1/2006 | Call |
| 2006/0020569 A1 | 1/2006 | Goodman et al. |
| 2006/0044674 A1 | 3/2006 | Martin et al. |
| 2006/0075007 A1 | 4/2006 | Anderson et al. |
| 2006/0095385 A1 | 5/2006 | Atkinson et al. |
| 2006/0100912 A1 | 5/2006 | Kumar et al. |
| 2006/0161879 A1 | 7/2006 | Lubrecht et al. |
| 2006/0169769 A1 | 8/2006 | Boyarsky et al. |
| 2006/0224846 A1 | 10/2006 | Amarendran et al. |
| 2006/0248165 A1 | 11/2006 | Sridhar et al. |
| 2006/0282194 A1 | 12/2006 | Schaefer et al. |
| 2006/0285172 A1 | 12/2006 | Hull et al. |
| 2006/0288044 A1 | 12/2006 | Kashiwagi et al. |
| 2007/0061266 A1 | 3/2007 | Moore et al. |
| 2007/0130105 A1 | 6/2007 | Papatia |
| 2007/0156897 A1 | 7/2007 | Lim |
| 2007/0185912 A1 | 8/2007 | Gupta et al. |
| 2007/0198722 A1 | 8/2007 | Kottomtharayil et al. |
| 2007/0198802 A1 | 8/2007 | Kavuri |
| 2007/0288536 A1 | 12/2007 | Sen et al. |
| 2008/0059515 A1 | 3/2008 | Fulton |
| 2008/0059704 A1 | 3/2008 | Kavuri |
| 2008/0141242 A1 | 6/2008 | Shapiro |
| 2008/0229037 A1 | 9/2008 | Bunte et al. |
| 2008/0243420 A1 | 10/2008 | Gokhale et al. |
| 2008/0243754 A1 | 10/2008 | Gokhale et al. |
| 2008/0243795 A1 | 10/2008 | Prahlad et al. |
| 2008/0243870 A1 | 10/2008 | Muller et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0249656 A1 | 10/2008 | Gokhale et al. |
| 2008/0250076 A1 | 10/2008 | Muller et al. |
| 2008/0256269 A1 | 10/2008 | Ookubo |
| 2008/0320319 A1 | 12/2008 | Muller et al. |
| 2009/0063765 A1 | 3/2009 | Kottomtharayil et al. |
| 2009/0113056 A1 | 4/2009 | Tameshige et al. |
| 2009/0271541 A1 | 10/2009 | Aoki et al. |
| 2009/0313448 A1 | 12/2009 | Gokhale et al. |
| 2009/0319534 A1 | 12/2009 | Gokhale |
| 2009/0319585 A1 | 12/2009 | Gokhale |
| 2010/0017184 A1 | 1/2010 | Retnamma et al. |
| 2010/0030528 A1 | 2/2010 | Smith et al. |
| 2010/0070466 A1 | 3/2010 | Prahlad et al. |
| 2010/0070474 A1 | 3/2010 | Lad |
| 2010/0070726 A1 | 3/2010 | Ngo et al. |
| 2010/0082672 A1 | 4/2010 | Kottomtharayil et al. |
| 2010/0131467 A1 | 5/2010 | Prahlad et al. |
| 2010/0138393 A1 | 6/2010 | Crescenti et al. |
| 2010/0287234 A1 | 11/2010 | Kottomtharayil et al. |
| 2010/0293112 A1 | 11/2010 | Prahlad et al. |
| 2011/0010440 A1 | 1/2011 | Kottomtharayil et al. |
| 2011/0040799 A1 | 2/2011 | Devassy et al. |
| 2011/0087807 A1 | 4/2011 | Kottomtharayil et al. |
| 2011/0093672 A1 | 4/2011 | Gokhale et al. |
| 2011/0213755 A1 | 9/2011 | Kavuri et al. |
| 2011/0231852 A1 | 9/2011 | Gokhale et al. |
| 2011/0270859 A1 | 11/2011 | Kottomtharayil |
| 2012/0059985 A1 | 3/2012 | Devassy et al. |
| 2012/0084523 A1 | 4/2012 | Littlefield et al. |
| 2012/0265732 A1 | 10/2012 | Gokhale et al. |
| 2012/0265936 A1 | 10/2012 | Kottomtharayil |
| 2014/0075001 A1 | 3/2014 | Kottomtharayil et al. |
| 2015/0026401 A1 | 1/2015 | Kottomtharayil et al. |

FOREIGN PATENT DOCUMENTS

| | | |
|---|---|---|
| EP | 0467546 | 1/1992 |
| EP | 0620553 | 10/1994 |
| EP | 0757317 | 2/1997 |
| EP | 0774715 | 5/1997 |
| EP | 0809184 | 11/1997 |
| EP | 0899662 | 3/1999 |
| EP | 0981090 | 2/2000 |
| EP | 1174795 | 1/2002 |
| EP | 1115064 | 12/2004 |
| GB | 2366048 | 2/2002 |
| JP | 7254204 | 10/1995 |
| JP | 9044381 | 2/1997 |
| JP | 9081424 | 3/1997 |
| WO | WO 91/14229 A1 | 9/1991 |
| WO | WO 95/13580 | 5/1995 |
| WO | WO 99/12098 | 3/1999 |
| WO | WO 99/14692 | 3/1999 |
| WO | WO 99/17204 | 4/1999 |
| WO | WO 2004/090788 | 10/2004 |
| WO | WO 2005/024573 | 3/2005 |
| WO | WO 2005/055093 | 6/2005 |

OTHER PUBLICATIONS

Armstead et al., "Implementation of a Campus-Wide Distributed Mass Storage Service: The Dream vs. Reality," IEEE, 1995, pp. 190-199.

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Commvault Systems, Inc., Continuous Data Replicator 7.0, Product Data Sheet, 2007, in 6 pages.

Eitel, "Backup and Storage Management in Distributed Heterogeneous Environments," IEEE, 1994, pp. 124-126.

Farley, "Building Storage Networks," pp. 328-331, Osborne/McGraw-Hill, 2000.

Gait, "The Optical File Cabinet: A Random-Access File system for Write-Once Optical Disks," IEEE Computer, vol. 21, No. 6, pp. 11-22 (1988).

(56) References Cited

OTHER PUBLICATIONS

Gibson, "Network Attached Storage Architecture," pp. 37-45, ACM, Nov. 2000.
http://en.wikipedia.org/wiki/Naive_Bayes_classifier, printed on Jun. 1, 2010, in 7 pages.
Dander, "Launching Storage-Area Net," Data Communications, US, McGraw Hill, NY, vol. 27, No. 4(Mar. 21, 1998), pp. 64-72.
Recycle Bin (Windows), Aug. 2007, Wikipedia, pp. 1-3.
Rosenblum et al., "The Design and Implementation of a Log-Structure File System," Operating Systems Review SIGOPS, vol. 25, No. 5, New York, US, pp. 1-15 (May 1991).
International Search Report and Written Opinion dated Nov. 13, 2009, PCT/US2007/081681, in 8 pages.
International Search Report and Preliminary Report on Patentability dated Dec. 3, 2003, PCT/US2003/028319 in 5 pages.
Great Britain Office Action dated Mar. 8, 2006, Application No. GB/0507268.1, in 3 pages.
Indian Office Action dated May 29, 2008, Application No. 60/CHENP/2005-AR, in 3 pages.
Canadian Office Action dated May 30, 2008, Application No. CA2498174, in 3 pages.
Canadian Office Action dated Feb. 9, 2009, Application No. CA2498174, in 2 pages.
International Search Report and Preliminary Report on Patentability dated Sep. 22, 2004, PCT/US2004/010504, in 6 pages.
International Search Report dated Sep. 20, 2004, PCT/US2004/010503, in 2 pages.
Written Opinion mailed Mar. 1, 2007, International Application No. PCT/US05/40606, in 5 pages.
International Search Report from International Application No. PCT/US05/40656, dated Mar. 1, 2007; 1 page.
Office Action in Canadian Application No. 2,587,055 dated Mar. 14, 2013, in 2 pages.
Office Action in Canadian Application No. 2,587,055 dated Mar. 18, 2014, in 2 pages.
Great Britain Office Action dated Nov. 2, 2007, Application No. GB/07071772, in 3 pages.
Great Britain Office Action dated Apr. 4, 2008, Application No. GB/07071772, in 2 pages.
First Examination Report in EU Application No. 04 758 913.0-2413 dated Nov. 21, 2008, in 6 pages.
Second Examination Report in EU Application 04 758 913.0-2413 dated May 26, 2010, in 7 pages.
First Examination in Australian Appl. No. 2004227949 dated Apr. 17, 2009, in 2 pages.
First Examination Report in Indian Appl. No. 2508/CHENP/2005 dated Feb. 15, 2008, in 2 pages.
Second Office Action in Canadian Application No. 2,520,498 dated Jun. 8, 2010, in 2 pages.
First Office Action in Canadian Application No. 2,520,498 issued Nov. 17, 2008, in 2 pages.
Office Action in Israeli Application No. 171121 issued Feb. 13, 2011, in 5 pages.
Szor, The Art of Virus Research and Defense, Symantec Press (2005) ISBN 0-321-30454-3, Part 1.
Szor, The Art of Virus Research and Defense, Symantec Press (2005) ISBN 0-321-30454-3, Part 2.
Witten et al., Data Mining: Practical Machine Learning Tools and Techniques, Ian H. Witten & Eibe Frank, Elsevier (2005) ISBN 0-12-088407-0, Part 1.
Witten et al., Data Mining: Practical Machine Learning Tools and Techniques, Ian H. Witten & Eibe Frank, Elsevier (2005) ISBN 0-12-088407-0, Part 2.
U.S. Appl. No. 09/609,977, filed Jul. 5, 2000, Prahlad.
U.S. Appl. No. 10/655,764, filed Sep. 5, 2003, Nourmohamadian.
U.S. Appl. No. 11/269,513, filed Nov. 7, 2005, Prahlad.
U.S. Appl. No. 13/534,070, filed Jun. 27, 2012, Kottomtharayil, et al.
Office Action in Canadian Application No. 2,520,498 issued Jun. 15, 2011, in 2 pages.
Allen, "Probability, Statistics and Queuing Theory", 1978, p. 370, col. 19, Lines 3-33, 1 page.
Campbell, "Linux and Windows NO 4.0: Basic Administration—Part III", internet publication, Oct. 5, 2000, retrieved from the internet, pp. 1-6.
Carrington, "Backups Using the "at" Command", internet publication, May 4, 1999, retrieved from the internet, 1 page.
Cook "Ntbackup: eject tape at end of Backup?", internet publication, Oct. 18, 2000, retrieved from the internet, 1 page.
MDM, Automatically eject tape:, internet publication, Jun. 7, 1999, retrieved from the internet, 1 page.
Savill, Windows NT FAQ Single File Version: internet publication, 2000, retrieved from the internet, pp. 1-8.

\* cited by examiner

SYSTEMS AND METHODS FOR PERFORMING STORAGE OPERATIONS IN A COMPUTER NETWORK

CROSS-REFERENCE TO RELATED APPLICATIONS

Any and all priority claims identified in the Application Data Sheet, or any correction thereto, are hereby incorporated by reference under 37 CFR 1.57.

This application is also related to the following patents and application, each of which is hereby incorporated herein by reference in its entirety:

U.S. Pat. No. 6,418,478, titled PIPELINED HIGH SPEED DATA TRANSFER MECHANISM, issued Jul. 9, 2002;

U.S. Pat. No. 7,035,880, titled MODULAR BACKUP AND RETRIEVAL SYSTEM USED IN CONJUNCTION WITH A STORAGE AREA NETWORK, issued Apr. 25, 2006;

U.S. Pat. No. 6,542,972, titled LOGICAL VIEW AND ACCESS TO PHYSICAL STORAGE IN MODULAR DATA AND STORAGE MANAGEMENT SYSTEM, issued Apr. 1, 2003; and U.S. Provisional Patent Application No. 60/409,183, titled DYNAMIC STORAGE DEVICE POOLING IN A COMPUTER SYSTEM, filed Sep. 9, 2002.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

1. Field of the Invention

The invention disclosed herein relates generally to performing storage operations on electronic data in a computer network. More particularly, the present invention relates to selecting, in response to the initiation of a storage operation and according to selection logic, a media management component and a network storage device to perform storage operations on electronic data.

2. Description of the Related Art

Storage of electronic data has evolved through many forms. During the early development of the computer, storage of this data was limited to individual computers. Electronic data was stored in the Random Access Memory (RAM) or some other storage medium such as a hard drive or tape drive that was an actual part of the individual computer.

Later, with the advent of networked computing, storage of electronic data gradually migrated from the individual computer to stand-alone storage devices accessible via a network. These individual network storage devices soon evolved in the form of networkable tape drives, optical libraries, Redundant Arrays of Inexpensive Disks (RAID), CD-ROM jukeboxes, and other devices. Common architectures included drive pools, which generally are logical collections of drives with associated media groups including the tapes or other storage media used by a given drive pool.

Serial, parallel, Small Computer System Interface (SCSI), or other cables, directly connected these stand-alone storage devices to individual computers that were part of a network of other computers such as a Local Area Network (LAN) or a Wide Area Network (WAN). Each individual computer on the network controlled the storage devices that were physically attached to that computer and could also access the storage devices of the other network computers to perform backups, transaction processing, file sharing, and other storage-related operations.

Network Attached Storage (NAS) is another storage scheme using stand-alone storage devices in a LAN or other such network. In NAS, a storage controller computer still "owns" the storage device to the exclusion of other computers on the network, but the SCSI or other cabling directly connecting that storage device to the individual controller or owner computer is eliminated. Instead, storage devices are directly attached to the network itself.

Yet another network storage scheme is modular storage architecture which is more fully described in application Ser. No. 09/610,738, now U.S. Pat. No. 7,035,880, issued Apr. 25, 2006, and application Ser. No. 09/774,268, now U.S. Pat. No. 6,542,972, issued Apr. 1, 2003. An example of such a software application is the Galaxy™ system, by CommVault Systems of Oceanport, N.J. The Galaxy™ system is a multi-tiered storage management solution which includes, among other components, a storage manager, one or more media agents, and one or more storage devices. The storage manager directs storage operations of client data to storage devices such magnetic and optical media libraries. Media agents are storage controller computers that serve as intermediary devices managing the flow of data from client information stores to individual storage devices. Each storage device is uniquely associated with a particular media agent and this association is tracked by the storage manager.

A common feature shared by all of the above-described network architectures is the static relationship between storage controller computers and storage devices. In these traditional network architectures, storage devices can each only be connected, virtually or physically, to a single storage controller computer. Only the storage controller computer to which a particular device is physically connected has read/write access to that device. A drive pool and its associated media group, for example, can only be controlled by the computer to which it is directly connected. Therefore, all backup from other storage controller computers needs to be sent via the network before it can be stored on the storage device connected to the first storage controller computer.

At times, storage solutions in some of the above-described network architectures including LAN, NAS, and modular storage systems may cause overloading of network traffic during certain operations associated with use of storage devices on the network. The network cable has a limited amount of bandwidth that must be shared among all the computers on the network. The capacity of most LAN or network cabling is measured in megabits per second (mbps) with 10 mbps and 100 mbps being standard. During common operations such as system backups, transaction processing, file copies, and other similar operations, network traffic often becomes overloaded as hundreds of megabytes (MB) and gigabytes (GB) of information are sent over the network to the associated storage devices. The capacity of the network computers to stream data over the network to the associated storage devices in this manner is greater than the bandwidth capacity of the cabling itself so ordinary network activity and communication slows to a crawl. As long as the storage devices are attached to the LAN or other network, this bandwidth issue remains a problem.

The Storage Area Network (SAN) is a highly-evolved network architecture designed to facilitate transport of electronic data and address this bandwidth issue. SAN architecture requires at least two networks. First, there is the traditional network described above which is typically a LAN or other such network designed to transport ordinary traffic between network computers. Then, there is the SAN itself which is a second network that is attached to the servers of the first network. The SAN is a separate network generally reserved for bandwidth-intensive operations such as backups, transaction processing, and the like also described above. The cabling used in the SAN is usually of much higher bandwidth capacity than that used in the first network such as the LAN and the communication protocols used over the SAN cabling are optimized for bandwidth-intensive traffic. Most importantly, the storage devices used by the network computers for the bandwidth-intensive operations are attached to the SAN rather than the LAN. Thus, when the bandwidth-intensive operations are required, they take place over the SAN and the LAN remains unaffected.

CommVault's proprietary DataPipe™ mechanism further described in U.S. Pat. No. 6,418,478 is used with a SAN to further reduce bandwidth constraints. The DataPipe™ is the transport protocol used to facilitate and optimize electronic data transfers taking place over a Storage Area Network (SAN) as opposed to those taking place over a LAN using NAS.

None of these solutions, however, address the static relationship between individual storage controller computers and individual storage devices. LANs, WANs, and even SANs using a DataPipe™ all require a static relationship between storage controller computer and storage device since each storage device on the network is uniquely owned by a storage controller computer. As discussed, when a storage device in this traditional architecture is assigned to a storage controller computer, that storage controller computer owns the device indefinitely and to the exclusion of other computers on the network. This is also true with both logical and physical storage volumes. One computer cannot control the drive pool and media group being that is controlled by another. Requests to store and retrieve data from such a drive pool and media group would have to first pass through the controlling computer. Such a static relationship between storage controller computer and storage device often leads to an inefficient use of resources.

For example, if each storage controller computer needs access to two storage devices and there are five storage controller computers in the network, then a total of ten storage devices will be required. The actual amount of work each of the ten storage devices performs might be much less than the workload capacity of each storage device. Such underutilization of storage device resources cannot be solved when a static relationship is required between storage device and storage controller computer.

If the static relationship were dynamic, however, and storage controller computers could actually share devices, then this underutilization can be addressed. Assuming in the above example that each of the five storage controller computers only uses ten percent of each device's workload capacity, then if all the storage controller computers could actually share the same two storage devices, eight of the storage devices could be eliminated without loss of performance or capability.

Furthermore, none of these existing solutions provide access to storage devices in the event of a storage controller failure. For example, if a storage controller computer were unavailable due to a hardware or software malfunction, then other computers on the network would not be able to access data stored on any storage device associated with the storage controller computer. Until the storage controller computer was brought back online, the data contained on any associated storage device would be effectively unrecoverable. If the association between the storage controller computer and a storage device were not static, however, then another storage controller computer could bypass the unavailable storage controller computer and access the storage device to retrieve the data.

There is thus also a need for a system which enables dynamic association of storage controller computers and storage devices.

SUMMARY OF THE INVENTION

The present invention addresses, among other things, the problems discussed above performing storage operations on electronic data in a computer network.

In accordance with some aspects of the present invention, computerized methods are provided for dynamically selecting media agents and storage devices to perform storage operations on data. The system selects, in response to the initiation of a storage operation and according to a first set of selection logic, a media management component to manage the storage operation. The system also selects, in response to the initiation of the storage operation and according to a second set of selection logic, a network storage device to associate with the storage operation. Using the selected media management component and the selected network storage device, the system performs the storage operation on the data.

In another embodiment, the system provides a method for sharing a magnetic media volume in a network. The system, in response to a volume sharing request, removes an association between a first media management component and the magnetic media volume. For example, in some embodiments, the system removes an index entry associating a first media management component and the magnetic media volume. In response to a volume sharing request and according to a set of selection logic, the system associates a second media management component with the magnetic media volume. For example, in some embodiments the system creates an index entry associating the second media management component and the magnetic media volume. In other embodiments, the system mounts the magnetic media volume to the second media management component.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

Figure 1:
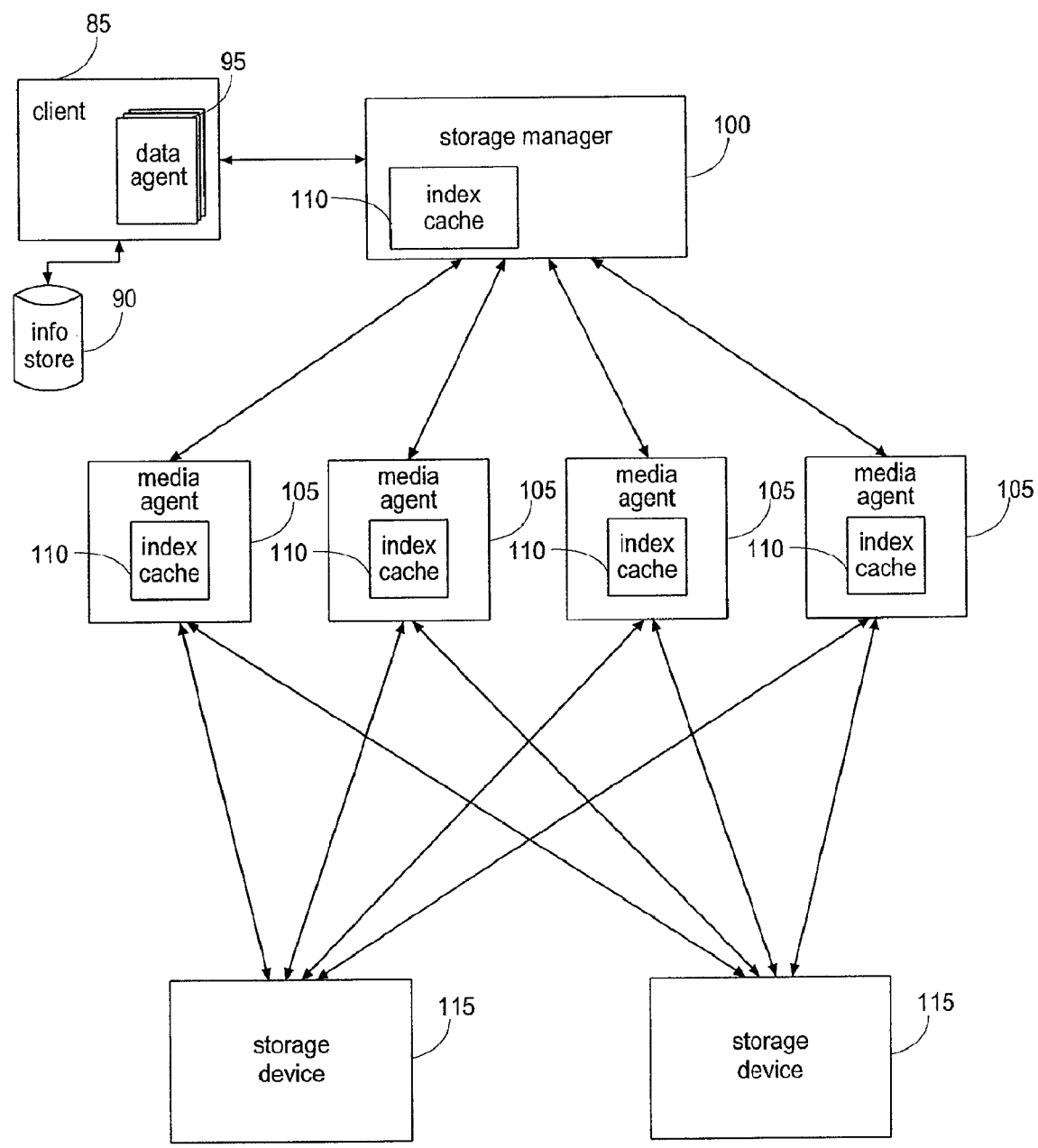
FIG. 1 is a block diagram of a network architecture for a system to perform storage operations on electronic data in a computer network according to an embodiment of the invention.

With reference to FIGS. 1 through 7, embodiments of the invention are presented. FIG. 1 presents a block diagram of a network architecture for a system to perform storage operations on electronic data in a computer network according to an embodiment of the invention. As shown, the system includes a storage manager 100 and one or more of the following: a client 85, an information store 90, a data agent 95, a media agent 105, an index cache 110, and a storage device 115. The system and elements thereof are exemplary of a three-tier backup system such as the CommVault Galaxy™ backup system, available from CommVault Systems, Inc. of Oceanport, N.J., and further described in application Ser. No. 09/610,738, now U.S. Pat. No. 7,035,880, issued Apr. 25, 2006, which is incorporated herein by reference in its entirety.

A data agent 95 is generally a software module that is generally responsible for archiving, migrating, and recovering data of a client computer 85 stored in an information store 90 or other memory location. Each client computer 85 has at least one data agent 95 and the system can support many client computers 85. The system provides a plurality of data agents 95 each of which is intended to backup, migrate, and recover data associated with a different application. For example, different individual data agents 95 may be designed to handle Microsoft Exchange™ data, Lotus Notes™ data, Microsoft Windows 2000™ file system data, Microsoft Active Directory™ Objects data, and other types of data known in the art.

If a client computer 85 has two or more types of data, one data agent 95 is generally required for each data type to archive, migrate, and restore the client computer 85 data. For example, to backup, migrate, and restore all of the data on a Microsoft Exchange 2000™ server, the client computer 85 would use one Microsoft Exchange™ 2000 Mailbox data agent 95 to backup the Exchange 2000™ mailboxes, one Microsoft Exchange 2000™ Database data agent 95 to backup the Exchange 2000™ databases, one Microsoft Exchange 2000™ Public Folder data agent 95 to backup the Exchange 2000™ Public Folders, and one Microsoft Windows 2000™ File System data agent 95 to backup the client computer's 85 file system. These data agents 95 would be treated as four separate data agents 95 by the system even though they reside on the same client computer 85.

The storage manager 100 is generally a software module or application that coordinates and controls the system. The storage manager 100 communicates with all elements of the system including client computers 85, data agents 95, media agents 105, and storage devices 115, to initiate and manage system backups, migrations, and recoveries.

A media agent 105 is generally a software module that conducts data, as directed by the storage manager 100, between the client computer 85 and one or more storage devices 115 such as a tape library, a magnetic media storage device, an optical media storage device, or other storage device. The media agent 105 is communicatively coupled with and controls the storage device 115. For example, the media agent 105 might instruct the storage device 115 to use a robotic arm or other means to load or eject a media cartridge, and to archive, migrate, or restore application specific data. The media agent 105 generally communicates with the storage device 115 via a local bus such as a SCSI adaptor. In some embodiments, the storage device 115 is communicatively coupled to the data agent 105 via a Storage Area Network ("SAN").

Each media agent 105 maintain an index cache 110 which stores index data the system generates during backup, migration, and restore storage operations as further described herein. For example, storage operations for Microsoft Exchange data generate index data. Index data provides the system with an efficient mechanism for locating user files for recovery operations. This index data is generally stored with the data backed up to the storage device 115, and the media agent 105 that controls the storage operation also writes an additional copy of the index data to its index cache 110. The data in the media agent 105 index cache 110 is thus readily available to the system for use in storage operations and other activities without having to be first retrieved from the storage device 115.

The storage manager 100 also maintains an index cache 110. Index data is also used to indicate logical associations between components of the system, user preferences, management tasks, and other useful data. For example, the storage manager 100 might use its index cache 110 to track logical associations between media agents 105 and storage devices 115.

Index caches 110 typically reside on their corresponding storage component's hard disk or other fixed storage device. Like any cache, the index cache 110 has finite capacity and the amount of index data that can be maintained directly corresponds to the size of that portion of the disk that is allocated to the index cache 110. In one embodiment, the system manages the index cache 110 on a least recently used ("LRU") basis as known in the art. When the capacity of the index cache 110 is reached, the system overwrites those files in the index cache 110 that have been least recently accessed with the new index data. In some embodiments, before data in the index cache 110 is overwritten, the data is copied to an index cache 110 copy in a storage device 115. If a recovery operation requires data that is no longer stored in the index cache 110, such as in the case of a cache miss, the system recovers the index data from the index cache 110 copy stored in the storage device 115.

In some embodiments, components of the system may reside and execute on the same computer. In some embodiments, a client computer 85 component such as a data agent 95, a media agent 105, or a storage manager 100 coordinates and directs local archiving, migration, and retrieval application functions as further described in application Ser. No. 09/610,738, now U.S. Pat. No. 7,035,880, issued Apr. 25, 2006. This client computer 85 component can function independently or together with other similar client computer 85 components.

Figure 2:
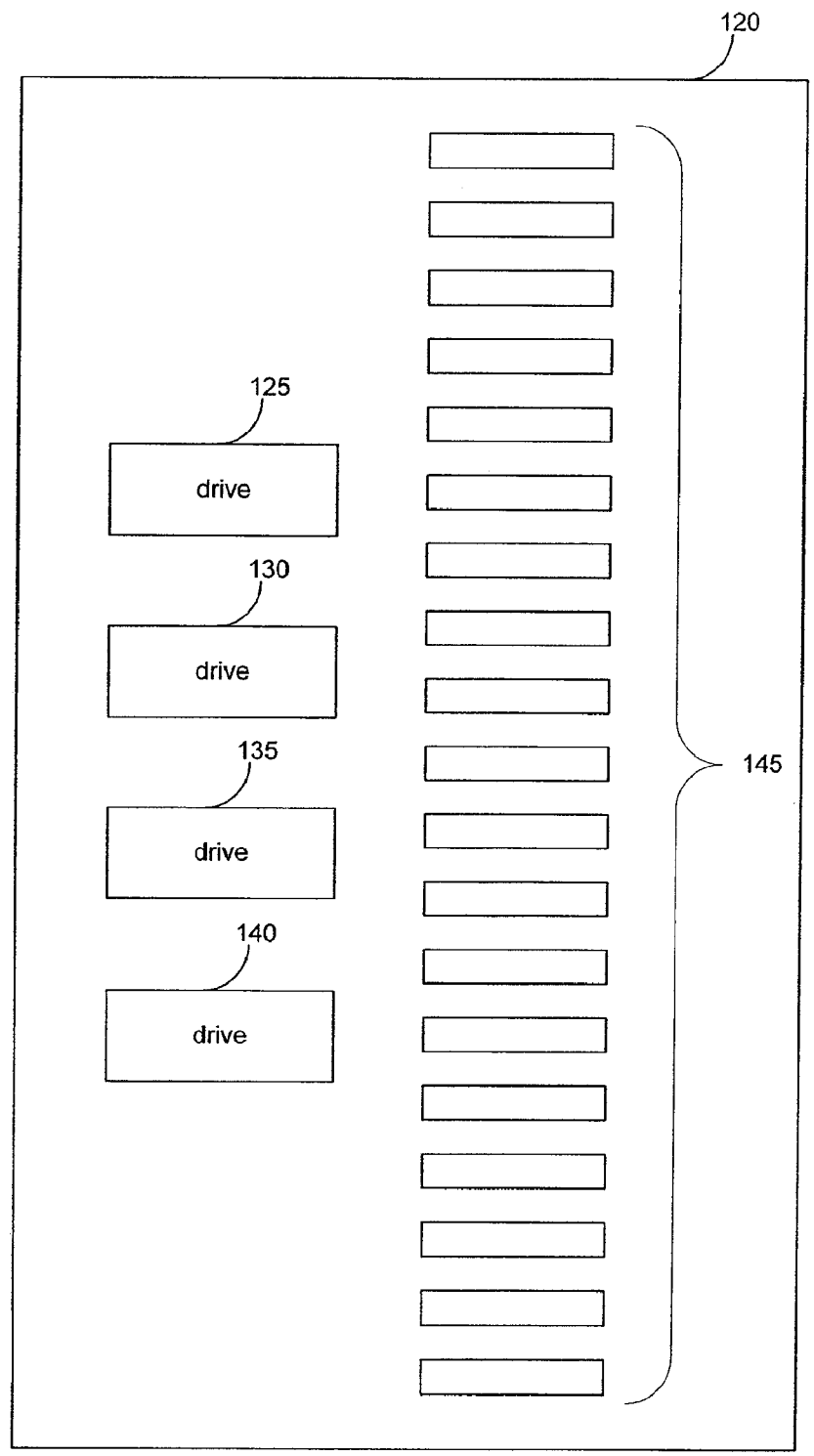
FIG. 2 is a block diagram of an exemplary tape library storage device for a system to perform storage operations on electronic data in a computer network according to an embodiment of the invention.
Figure 3:
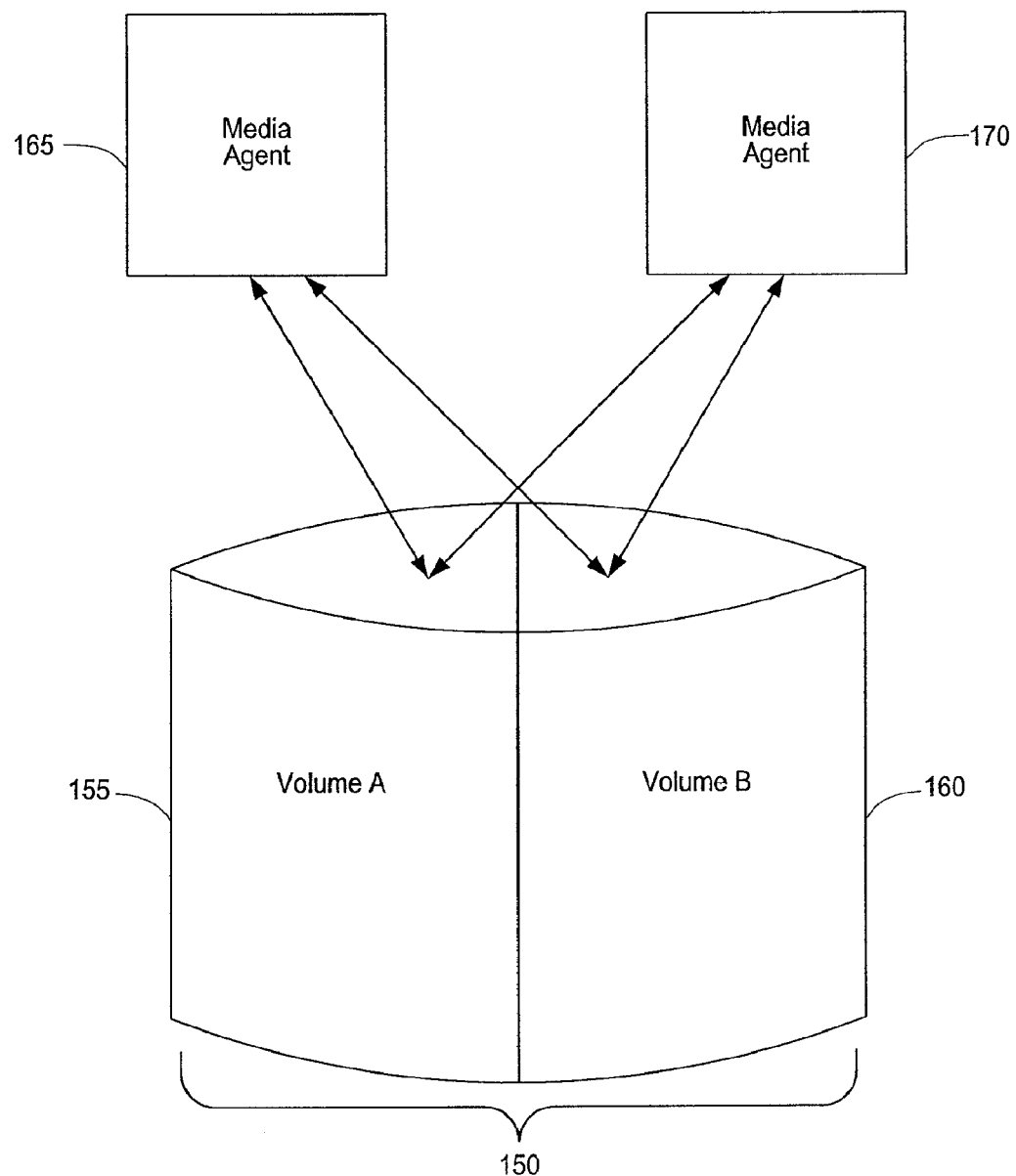
FIG. 3 is a block diagram of an exemplary magnetic media storage device for a system to perform storage operations on electronic data in a computer network according to an embodiment of the invention.

FIG. 2 presents a block diagram of an exemplary tape library storage device 120 for a system to perform storage operations on electronic data in a computer network according to an embodiment of the invention. The tape library storage device 120 contains tapes 145 and drives 125, 130, 135, and 140. The tapes 145 store electronic data containing backups of application data, user preferences, system information, and other useful information known in the art. Drives 125, 130, 135, and 140 are used to store and retrieve electronic data from the tapes 145. In some embodiments, drives 125, 130, 135, and 140 function as a drive pool, as further described in Application Ser. No. 60/409,183 which is hereby incorporated herein by reference in its entirety. A drive pool is generally a logical concept associated with a storage policy. Storage policies representing storage patterns and preferences are more fully discussed in application Ser. No. 09/774,268, now U.S. Pat. No. 6,542,972, issued Apr. 1, 2003, which is hereby incorporated by reference herein in its entirety.

The drive pool is identified by a set of drives within a tape library storage device 120 as pointed to by one or more media agents 105. For example, a drive pool known as DP1 consisting of drives 125 and 130 in tape library 120 known as LIB 1 could be associated by a storage policy with a first media agent 105 MA 1 in an index cache 110 entry as follows: LIB1/MA1/DP1. A second drive pool consisting of drives 130, 135, and 140 within the tape library storage device 120 associated with the same media agent 105 might be expressed in the index cache 110 as follows: LIB1/MA1/DP2.

Previously, however, drive pools had a static association with a particular media agent 105. A drive pool associated with a first media agent 105 could not be logically associated with a second drive pool associated with a second media agent 105. An index cache 110 entry associating a drive pool with a media agent 105 and other system components might, for example, specify a media library or media group, a media agent, and a drive pool. Only one of each component could be specified in a particular index cache 110 entry. Thus, such drive pools were logically exclusive and separate entries in an index cache 110 entry for a storage policy and could be logically represented as:

LIB1/MA1/DP1
LIB1/MA2/DP2

As further described herein, the present invention permits logical association of drive pools associated with different media agents 105. Multiple drive pools, media agents, and other system components can be associated in a single index cache 110 entry. Thus, for example, an index cache 110 entry for a storage policy, according to the present invention, may combine the two previous entries instead and thus be logically represented as:

LIB1/MA1/DP1/DP2
LIB1/MA2/DP2/DP1

In addition and as further described herein, tapes 145 are associated by the system with drive pools or storage policies, and not with individual drives 125, 130, 135, and 140. The recording format used to archive electronic data is a property of both its media group and its associated drive pool. A media group is a collection of tapes 145 or other storage media assigned to a specific storage policy. The media group dynamically points to different drive pools, even to those with different recording formats since the system updates the recording format of the media group in a media group table stored in the index cache 110 of the storage manager 100. Previously, tapes 145 associated with drive pools could share individual drives 125, 130, and 135, and 140, but tapes 145 associated with each drive pool remained logically separate by, among other factors, media groups. Thus, a given set of tapes 145 associated with a particular drive pool and storing data associated with a first storage policy copy could not also store data from a second storage policy copy. An index cache 110 entry would thus associate different tape sets 145 with different media agents 105, storage policies, drive pools, and other system components. For example, two different tape sets might be associated in two index cache 110 entries as follows:

storage policy1 : media agent1 : drive pool1 : tape set1
storage policy2 : media agent2 : drive pool2 : tape set2

All components are thus uniquely associated and require separate index cache 110 entries.

By contrast, the present invention, as further described herein, permits data associated with a particular storage policy copy to be stored on and share tapes 145, and other pieces or removable media such as optical discs, associated with and sharing one or more drive pools or storage policy copies. Data from each storage policy copy is appended to tapes 145 shared by other storage policy copies. Thus, a storage policy copy is shared between many media agents 105 in a dynamic drive pooling setting with tapes 145 also being shared by the different media agents 105 and storage policies. Tapes 145 can be located in any storage device 115 and tapes 145 for a given storage policy copy can even be spread across multiple storage devices 115. Thus, an index cache entry would associate multiple tape sets 145 with multiple media agents, storage policies, drive pools, and other system components. For example, two different tape sets from the previous example of index entries might be associated in a single index cache 110 entry as follows:

storage policy1 : media agent1 : drive pool1 : tape set1 : tape set2
storage policy2 : media agent2 : drive pool2 : tape set1 : tape set2

In addition to tape sets 145, a single index cache 110 entry can also specify and associate multiple media agents 105, storage policies, drive pools, network pathways, and other components.

Similarly, different media agents 105 and storage policies can also be associated with the same volumes on magnetic media. For example, turning to FIG. 3, a block diagram is presented of an exemplary magnetic media storage device for a system to perform storage operations on electronic data in a computer network according to an embodiment of the invention. A magnetic media storage device 150, such as a hard disk, is shown. The magnetic media storage device 150 is divided into two volumes 155 and 160 which are associated with a first media agent 165 and a second media agent 170. Previously, each volume on a magnetic media storage device 150 maintained a static relationship with a given media agent 105. For example, if the first volume 155 was associated with the first media agent 165, then the second media agent 170 would only be able to conduct storage operations with the first volume 155 by passing any associated electronic data through the first media agent 165.

The present invention, however, permits media agents 105 to share the same volume(s) on a given magnetic storage device. Thus, as further described herein, a first media agent 105 can perform, on a given magnetic media volume, storage operations on data associated with a first storage policy copy, and a second media agent can perform, on the same magnetic media volume, storage operations on different data associated with a second storage policy copy. For example, media agent 165 and 170 can both perform storage operations on the first volume 155 or the second volume 160.

Figure 4:
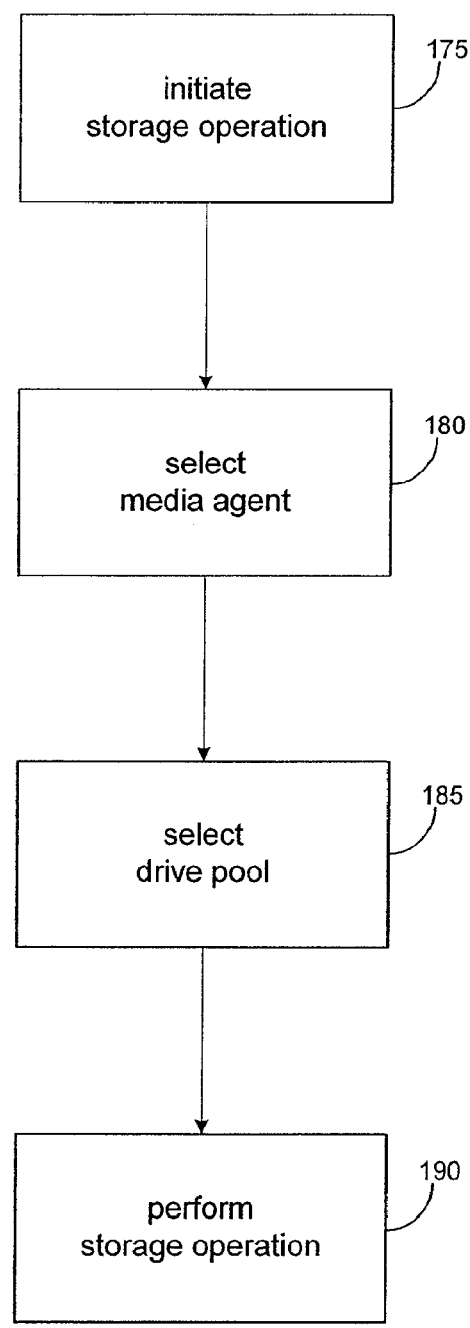
FIG. 4 is a flow chart of a method for performing storage operations on electronic data in a computer network according to an embodiment of the invention.

FIG. 4 presents a flow chart of a method for performing storage operations on electronic data in a computer network according to an embodiment of the invention. Selection of desired storage components for storage operations is performed dynamically. The system initiates a storage operation, step 175, in response to a scheduled procedure or as directed by a user. For example, the system might initiate a backup operation or a restore operation at a specific time of day or in response to a certain threshold being passed as specified in a storage policy. The system selects a media agent 105 according to selection logic further described herein, step 180. Some examples of selection logic include the ability to conduct a LAN-free storage operation, such as using a SAN, and the desire to optimize storage operations via load balancing. For example, an index entry in the storage manager 100 index cache 110 might associate certain media agents 105, storage devices 115, or other components with LAN-free storage operations either via user input, network topology detection algorithms known in the art, or other methods. As another example, the system might select a free media agent 105 to optimize storage operations via load balancing when a default media agent 105 or other media agent 105 specified in a storage policy is already performing other storage operations or otherwise occupied. The system also selects an appropriate drive pool in a network storage device according to selection logic further described herein, step 185. Once the system has selected an appropriate media agent and drive pool, the storage operation is performed, step 190 using the selected storage components.

Figure 5:
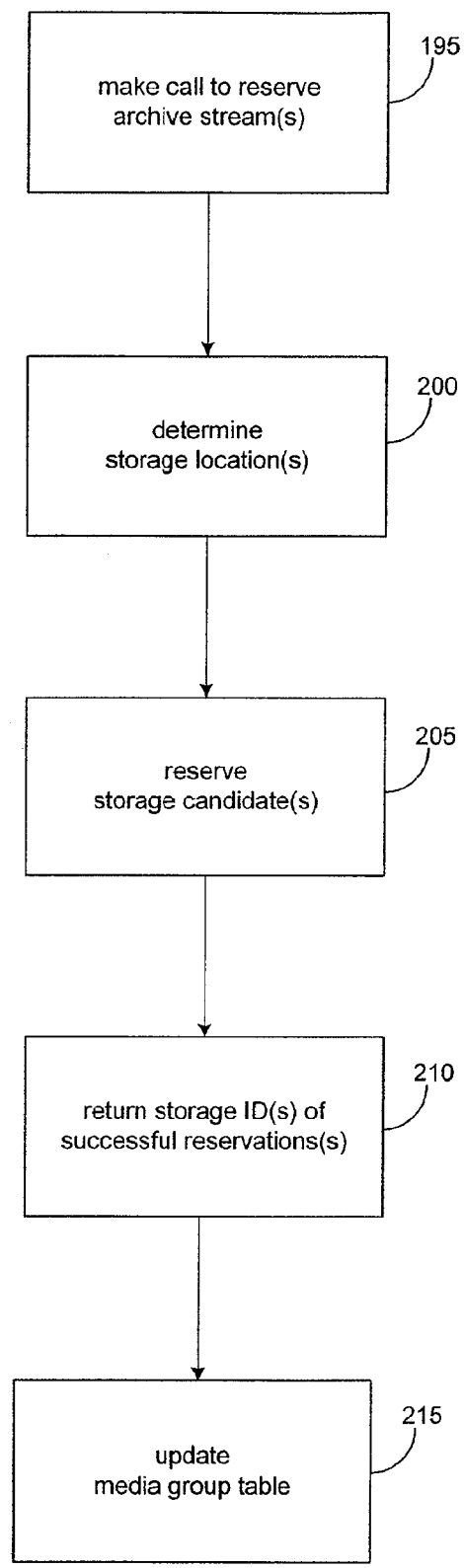
FIG. 5 is a flow chart of a method to archive electronic data in a system to perform storage operations on electronic data in a computer network according to an embodiment of the invention.

FIG. 5 presents a flow chart of a method to archive electronic data in a system to perform storage operations on electronic data in a computer network according to an embodiment of the invention. More specifically, FIG. 5 presents a method for dynamically selecting a drive pool according to an embodiment of the invention. The system makes a call to reserve one or more archive streams, step 195. Archive streams are generally data paths with permit storage operations to be performed in parallel on electronic data. An archive stream generally has a one-to-one correlation with a media group, such as a media agent 105 and storage device 115.

Thus, according to one embodiment of the invention, the number of archive streams allowed on a storage policy is the sum of all drives in all available drive pools. For example, a system with three drive pools composed of ten total drives could reserve ten archive streams to copy data to each of the drives simultaneously thus increasing storage efficiency and achieving other useful goals. In one embodiment, the system uses the number of drives in a selected drive pool as the default number of streams to reserve. In an alternate embodiment, the system uses magnetic storage libraries as storage devices 115 instead of tape libraries containing drives. Here, the maximum number of streams would equal the number of readers and writers on all mount paths to the magnetic storage libraries.

The system selects one or more appropriate storage locations for the data to be archived, step 200. In some embodiments, a resource manager module associated with the storage manager 100 selects the storage location(s). For example, a resource manager determines the appropriate storage device 115, media agent 105, and drive pool combination based on the pool of available storage network components and other criteria.

Additional criteria used in the selection process generally consider improving efficiency of the storage operation to be performed. Load balancing, for example, is one exemplary consideration. The system may contain a given number of drives, but some of those drives may be used by other jobs and thus unavailable. The system thus selects from among available drives as one selection criterion. Alternatively, the network path to a particular storage component may be experiencing heavy traffic and thus a less trafficked path offering greater bandwidth may be selected as desirable.

Another exemplary selection criterion is whether selection of a given drive or set of drives would enable LAN-free or auxiliary archiving. For example, in a given network, certain drives might be accessible via a SAN or other alternate storage route which would reduce the network traffic caused by an archiving operation. Preference, is thus given to selection of these drives over drives which would instead increase the network load.

Yet another exemplary selection criterion is in the case of a storage component failover situation. For example, where an entire media agent 105 or storage device 115 as a whole is offline or if a certain number of drives in a storage device are offline, then the system, in some embodiments, dynamically selects an alternate media agent 105 or drive pool to perform storage operations. In some embodiments, the alternate media agent 105 or drive pool in the case of failover is specified according to preferences associated with a storage policy. For example, a storage policy may contain a list of failover candidates or selection logic, as described herein, for selecting a storage location to serve as a failover candidate. In some embodiments, the failover candidates are expressed as a triplet indicating the media agent 105, the storage device 115, and, provided the storage device is not a magnetic media storage device 150, the drive pool. Thus, the triplet "LIB1/MA2/DP1" might be used to represent a failover candidate storage path using media agent 115 MA2, storage device 115 LIB1, and drive pool DP1. In other embodiments, a user specifies the alternate storage device 115, media agent 105, or drive pool directly.

The system reserves the selected storage candidates, step 205, and returns the storage IDs of successful reservations to the storage manager 100, step 210. In some embodiments, the storage IDs are unique identifiers enabling components of the system to identify and communicate with the storage candidates. For example, in some embodiments, the storage IDs comprise a unique component name coupled with a network path such as a Uniform Naming Convention ("UNC") entry. The storage IDs of the successful reservations are used to update a media group table stored in the storage manager 100 index cache 110 or other similar locations accessible to components of the system, step 215. The reserved components are thus accessible to other components of the system to perform the archive operation or other storage operations.

Figure 6:
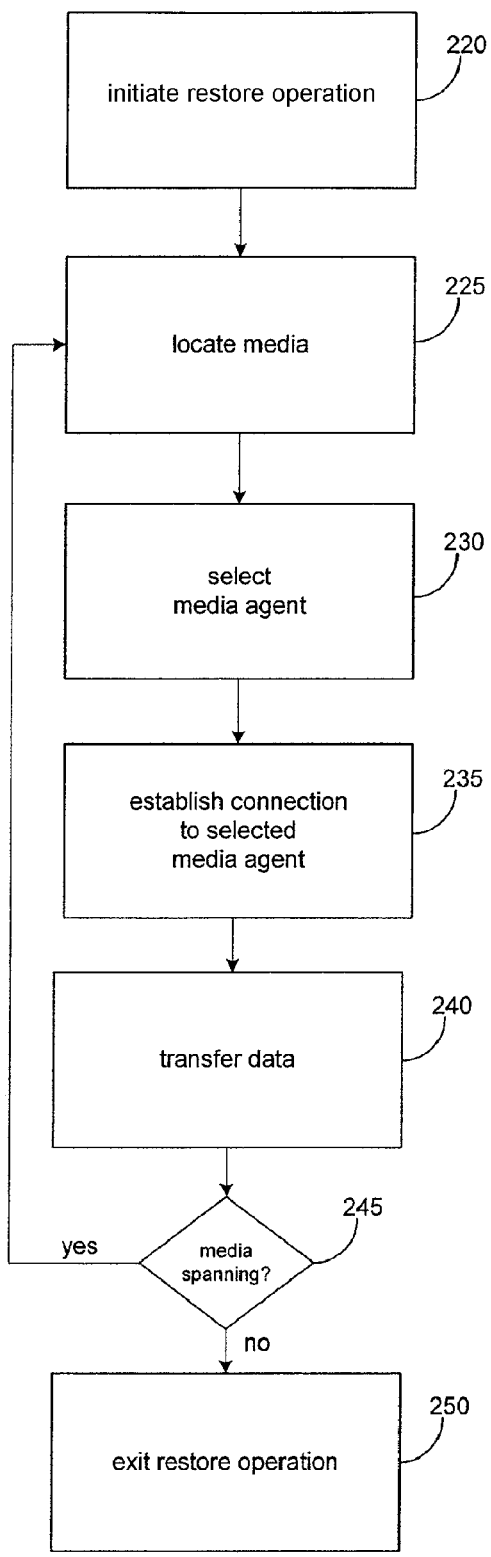
FIG. 6 is a flow chart of a method for restoring or auxiliary copying electronic data in a system to perform storage operations on electronic data in a computer network according to an embodiment of the invention.

FIG. 6 presents a flow chart of a method to restore or auxiliary copy electronic data in a system to perform storage operations on electronic data in a computer network according to an embodiment of the invention. A restore or auxiliary copy operation is initiated and the electronic data to be restored or copied is identified, step 220.

The system locates the media on which the electronic data to be restored or copied is stored, step 225. Thus, index data stored at the storage manager 100, a media agent 105, or another location is consulted to determine the media ID where the archive file of the electronic data starts. In some embodiments, the system consults a slot map table contained in the index cache 110 to determine the media ID where the archive file of the electronic data starts.

The system determines the library/media agent/drive pool combination for the source tape storing the electronic data being restored or copied, step 230. Alternatively, the system determines the library/media agent/magnetic storage media volume combination for the electronic data being restored or copied. As previously described, in some embodiments the system determines the media agent 105 according to user preferences, selection logic for increasing network efficiency, or other factors. For example, if the electronic data to be restored or copied is located on a particular tape 145 in a given storage device 115, there may be a finite set of media agents 105 that are associated with the storage device 115 due to network pathways, component failures, user preferences, or other reasons.

The system establishes a network connection to the selected media agent 105 and other components, step 235. In some embodiments, the system establishes a high speed connection, such as a DataPipe™ connection manufactured by CommVault Systems, and further described in U.S. Pat. No. 6,418,478, which is hereby incorporated herein by reference in its entirety. Electronic data is thus transferred over the established connection from the storage device 115 to its intended destination such as a network client 85, an information store 90, or other network component, step 240.

In some embodiments, the entire archive file is generally created by a single attempt of backup and is contained within and accessible to the same media agent 105. Thus, a media agent 105 is identified only when initially opening the archive file. When media spanning occurs in the middle of the archive file, however, such as in the case of a file spanning multiple tapes 145 or volumes, the subsequent pieces of media containing the remaining electronic data must be located and requested, step 245. In the case of media spanning, control thus returns to step 225 to locate the additional media and continue the storage operation.

In some embodiments, the initially selected media agent 105 is first queried to determine whether it is associated with the additional media, and if so, to continue the storage operation. If the initially selected media agent 105 is not associated with the additional media, the system queries the other media agents 105 in the network and attempts to locate the additional media. For example, the system may search index caches 110 associated with the system media agents 105 to locate the additional media. Alternatively, if the system cannot locate the additional media, the user is prompted to manually import or otherwise make available the media holding the additional electronic data required to complete the storage operation.

Figure 7:
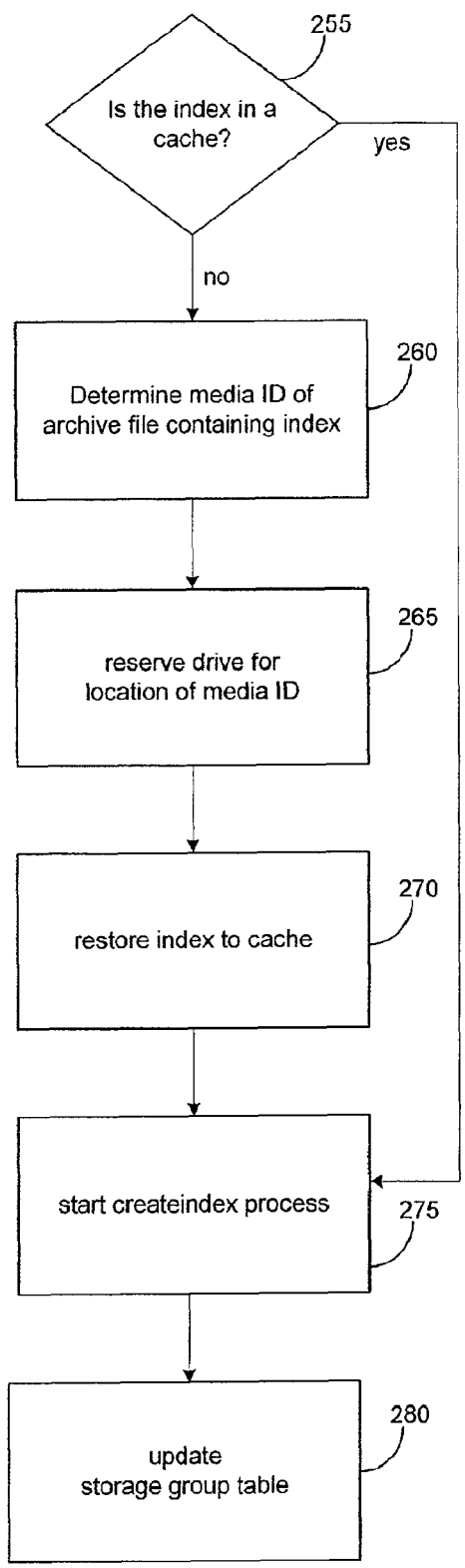
FIG. 7 is a flow chart of a method to restore a storage index in a system to perform storage operations on electronic data in a computer network according to an embodiment of the invention.

FIG. 7 presents a flow chart of a method to restore a storage index in a system to perform storage operations on electronic data in a computer network according to an embodiment of the invention. In larger storage networks, scalability problems sometimes occasion the loss of index cache 110 directories from media agents 105. For example, in a network with many media agents 105 and a great deal of storage operations being performed, media agents 105 may load and unload different index caches 110 depending on the electronic data subject to the storage operations being performed. Such loss of an index cache 110 directory from the memory of a media agent 105 requires that the index cache 110 directory be reloaded from stored media such as tapes 145 in a storage device. Reloading an index in this manner, however, often places strain on the network drives, and also results in high system resource usage through the instantiation of related processes and threads such as, for example, ifind, createindex, pipelines, and other actions. For example, when a media agent 105 performs a storage operation, the media agent index cache 110 is updated using a createindex process to indicate any new network pathways, changes to the files system, version information, and other information useful in performing storage operations. The index cache 110 directory must first be restored before the createindex process can be run to reflect these changes. The present invention, thus provides, in some embodiments, a method for efficiently restoring an index cache 110 directory.

The system determines whether there is an index in the cache 110 of a selected media agent, step 255. The system may query media agents 105 directly to determine if there is a copy of the index in a local cache 110. Alternatively, the system may look for the index in other locations, such as in a shared index system as further described herein.

If the index is not in the cache 110, then the system determines the media ID of the archive file containing the index by consulting reference tables stored in the media agent 105 or the storage manager 100 index cache 110, step 260. These tables identify the location of the index file and identify the actual storage media holding the index file such as a particular tape 145, volume 155, or other storage media. In the case of a tape 145 or other similar removable storage media, the system reserves a drive for accessing the media, step 265, and performs a storage operation to restore the index to the local cache 110 of the selected media agent 105, step 270. In some embodiments, such as in the case of multiple media agents 105 having access to the index, preference is given to a LAN-free or otherwise preferred media agent 105. This is advantageous in the case of backups since the createindex has a high chance of being on the same machine as the tail of the pipeline.

Once the system determines that the index is in the local cache 110 of the selected media agent 105, the index is updated or otherwise accessed, such as through a createindex process, to perform the storage operation at hand, step 275. The storage group table is updated to reflect the storage operations performed, step 280.

In some embodiments, the system employs a shared index cache 110 location. A shared index might be employed, for example, to make the index available to all media agents 105 that may need to participate in a storage operation. Multiple media agents 105, for example, might be candidates for load balancing or failover operations, and all need access to the network path of the index so that the index will be available to each of them. Otherwise, extra index restores would be required when different media agents 105 were used for subsequent storage operations. Thus, in some embodiments, the index cache location is indicated by a UNC path universally accessible via a username and password.

Each media agent 105 is also associated with a unique username and password that permit component authentication, access control, and other similar functions. The username, password, and UNC path to the shared index location is stored in memory associated with each media agent 105. In some embodiments, an indexing module of the media agent 105 employs user impersonation before accessing the index cache.

In an alternate embodiment, the system employs a shared index cache 110 in which a pool of network UNC paths is designated for each media agent 105 as a secondary storage area for the index. At the end of each backup, a media agent 105 copies the index to this secondary area which is accessible to all media agents 105 in the pool. Thus, when a media agent 105 requires the index, the media agent 105 queries both its local cache 110 and the pool of UNC paths to locate the correct index. If the index is located in the secondary area and not in the local cache 105, then the index is copied to the local area for immediate use. Upon completion of a storage operation, such as a backup or a restore, the index is copied back to the shared area so that other media agents 105 and processes can access the index.

In some embodiments, the system determines which media agent 105, for a given browse of a client 85 at a point in time, is most likely to already to have a useable index version already in its local cache 110. For example, in some embodiments, the storage manager 100 tracks which media agent 105 performed the last storage operation for a particular client 85. A media agent 105 is selected for a client 85 browse at time T such that the last backup in the full backup cycle at time>=T was done with indexing at that media agent 105.

Figure 8:
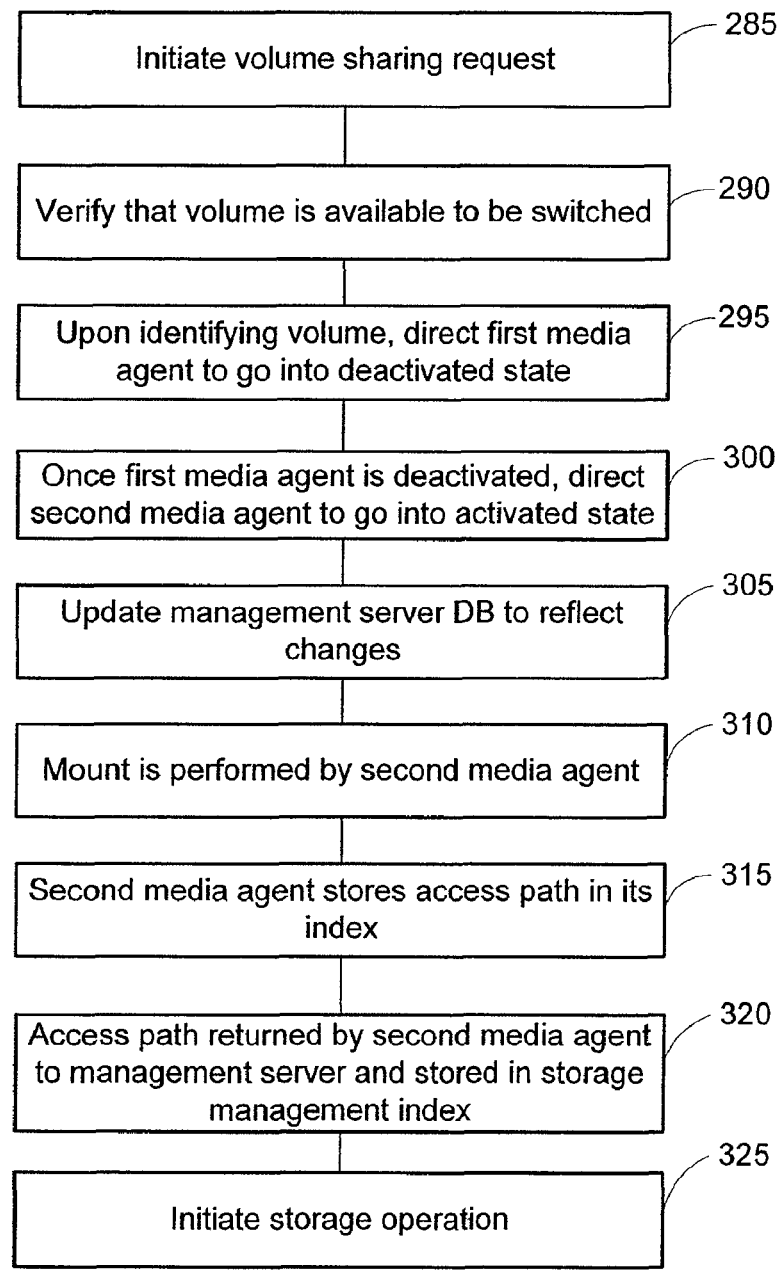
FIG. 8 is a flow diagram of a method to perform dynamic volume sharing according to one embodiment of the invention.

FIG. 8 presents a flow diagram showing how dynamic volume sharing is accomplished according to one embodiment of the invention. A client application or other application initiates a request to the storage manager 100 to perform a storage operation on electronic data on a storage device 115, such as a magnetic media storage device 150, in the network, and the storage manager 100 processes this request by requesting access to the volume on which the data is storage, step 285. When a client computer 85 is configured, client data that is to be subject to storage operations is associated with a particular media agent 115. When that client data is stored or retrieved in the future, the client computer 85 passes storage operation requests on to the associated media agent 115. The media agent 115 associates this client data with a particular storage media, such as a volume on a magnetic media storage device 150. Using dynamic volume sharing, one or more media agents can store and retrieve data among multiple volumes spanning multiple magnetic media storage devices 150.

When the media sharing request is received, the storage manager 100 verifies that a storage device 115 is available that can be switched to accommodate the request, step 290. The storage manager 100 tracks storage device 115 availability in the storage manager index cache 110 populated with information regarding available storage devices 115 and their respective media agent 105 controllers. Access paths across the network to media agents 105 and then on to appurtenant storage devices 115 are also stored in the storage manager index cache 110.

Upon identifying an appropriate storage device 115, the storage manager 100 directs the media agent 105 controlling the storage device 115 to go into a deactivated state with respect to that storage device, step 295. Even though, in some embodiments, there are multiple media agents executing on various hosts for the same storage device 115, the relationship is static and only one of them can control a storage device 115 at a given instant. The other media agents 105 are said to be in a deactivated state with respect to that storage device 115.

The deactivated media agents 105 run a listening process waiting for a message from the storage manager 100 directing them to become active with respect to a storage device 115. Once the first media agent 105 has been deactivated with respect to the storage device 115, the storage manager communicates to the listening process of a second media agent 105 on which the storage device 115 will be mounted to change from a deactivated state to an activated state with respect to the storage device 115, step 300. At this point the storage manager 100 also updates the storage manager cache 110 to reflect that control of the storage device 115 has been shifted from the first media agent 105 to the second media agent 105, and that the first media agent is now deactivated and that the second media agent is now activated with respect to that storage device, step 305.

The second media agent 105 communicates with the storage device 115 and executes procedures necessary to mount storage device 115 and any associated volumes to the second media agent, step 310. In some embodiments, the second media agent 105 mounts one or more of the volumes associated with the storage device 115, and volumes in the same storage device 115 not mounted by the second media agent 105 may be mounted or otherwise associated with other media agents 105. Once the mount is performed the storage device 150 and its associated volumes 150 are logically connected to the second media agent 105, and this access path is stored by the second media agent 105 in its index cache 110, step 315. The media agent 105 stores the access path to the storage device 115 in the media agent index cache 110 because a storage device 115 connected to multiple media agents 105 may have multiple access paths. Mounting the storage device 115 to the media agent 105 and the resultant access path produced is in large part related to the hardware configuration of the media agent 105. The media agent 105 is generally best-suited to store and delegate management of the access path to the storage device that it controls. In some alternate embodiments, the storage manager 100 stores and tracks the individual hardware configuration of all the network media agents 105 in the storage manager index cache 110 and then passes the resultant access paths to the network storage devices 115 on to the media agents 105 when necessary. In other embodiments, media agent 105 hardware configurations and resultant access paths to the network storage devices 115 are stored in a shared index location as further described herein.

Once the media agent 105 has completed the mount of the storage device 115 (and any associated volumes) and stored the access path to the storage device 115 in its own media agent index cache 110 or other location, then the access path to the storage device 115 is returned by the media agent 105 to the storage manager 100 where it is also stored in the storage manager index cache 110 for future recall, step 320. While media agents 115 generally communicate with storage devices 115 and the storage manager 100, the storage manager 100 generally communicates with client applications. In some embodiments, the storage manager 100 returns the storage device access path to a client application or other application and initiates a storage operation as appropriate, step 325.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDAs), and other devices suitable for the purposes described herein. Software and other modules may be accessible via local memory, via a network, via a browser or other application in an application service provider (ASP) context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for retrieving data in a network, the method comprising:
   identifying at least a first storage controller computer that retrieves backup data stored in a shared physical memory, wherein the shared physical memory is shared by different storage controller computers;
   identifying at least a second storage controller computer that serves as a failover storage controller computer to retrieve the backup data stored in the shared physical memory;
   performing a data retrieval operation with the first storage computer to retrieve at least a portion of the backup data stored in the shared physical memory;
   determining that the first storage controller computer is unable to perform the data retrieval operation; and
   directing, based on one or more storage policies, the second storage controller computer to perform the data retrieval operation to retrieve the backup data from the shared physical memory.

2. The method of claim 1, wherein the one or more storage policies comprises selection logic for selecting the second storage controller computer.

3. The method of claim 1, wherein the one or more storage polices comprises a list of storage controller computers that serve as failover candidates.

4. The method of claim 1, further comprising creating, with the first storage controller computer, a first index of the backup data stored in the shared physical storage device.

5. The method of claim 4, further comprising creating, with the second storage controller computer, a second index of the backup data stored in the shared physical storage device.

6. The method of claim 1, further comprising:
   creating, with the first storage controller computer, a first index of at least a portion of the backup data stored in the shared physical storage device;
   creating, with the second storage controller computer, a second index of at least a portion of the backup data stored in the shared physical storage device; and
   transferring copies of the first and second indexes to a storage manager computer.

7. The method of claim 1, further comprising:
   creating, with the first storage controller computer, a first index of at least a portion of the backup data stored in the shared physical storage device;
   creating, with the second storage controller computer, a second index of at least a portion of the backup data stored in the shared physical storage device; and
   transferring copies of the first and second indexes to the shared physical storage device.

8. The method of claim 1, wherein selecting the first storage controller computer further is based at least in part on load balancing the first and second storage controller computers.

9. The method of claim 1, further comprising deactivating the first storage controller computer.

10. The method of claim 9, further comprising mounting the second storage controller computer.

11. A system that retrieves data in a network, the system comprising:
    a first storage controller computer that retrieves backup data stored in a shared physical memory, wherein the shared physical memory is shared by different storage controller computers;
    a second storage controller computer that retrieves backup data stored in the shared physical memory;
    one or more storage policies that identify at least the first storage controller computer, wherein the one or more storage policies further identify at least a second storage controller computer that serves as a failover storage controller computer to retrieve the backup data stored in the shared physical memory; and
    in response to a determination that the first storage controller computer is unable to perform the data retrieval operation, a storage manager computer directs, based on one or more storage policies, the second storage controller computer to perform the data retrieval operation to retrieve the backup data from the shared physical memory.

12. The system of claim 11 wherein the one or more storage policies comprises selection logic for selecting the second storage controller computer.

13. The system of claim 11 wherein the one or more storage polices comprises a list of storage controller computers that serve as failover candidates.

14. The system of claim 11 wherein the first storage controller computer creates a first index of the backup data stored in the shared physical storage device.

15. The system of claim 14 wherein the second storage controller computer creates a second index of the backup data stored in the shared physical storage device.

16. The system of claim 11:
    wherein the first storage controller computer creates a first index of at least a portion of the backup data stored in the shared physical storage device;
    wherein the second storage controller computer creates a second index of at least a portion of the backup data stored in the shared physical storage device; and
    wherein the first and second storage controller computers transfer copies of the first and second indexes to a storage manager.

17. The system of claim 11:
    wherein the first storage controller computer creates a first index of at least a portion of the backup data stored in the shared physical storage device;
    wherein the second storage controller computer creates a second index of at least a portion of the backup data stored in the shared physical storage device; and
    wherein the first and second storage controller computers transfer copies of the first and second indexes to the shared physical storage device.

18. The system of claim 11, wherein the storage managers selects the first storage controller computer based at least in part on load balancing the first and second storage controller computers.

19. The system of claim 11, wherein the storage manager deactivates the first storage controller computer.

20. The system of claim 19, wherein the storage manager mounts the second storage controller computer.

* * * * *